United States Patent [19]

Sasaki

[11] Patent Number: 5,167,017

[45] Date of Patent: Nov. 24, 1992

[54] TEXT EDITING DEVICE

[75] Inventor: Ryoichi Sasaki, Nagoya, Japan

[73] Assignee: Brother Kogyo Kabushiki Kaisha, Aichi, Japan

[21] Appl. No.: 381,156

[22] Filed: Jul. 17, 1989

[30] Foreign Application Priority Data

Jul. 15, 1988 [JP] Japan .................. 63-177562

[51] Int. Cl.⁵ .............................................. G06F 3/14
[52] U.S. Cl. ................................. 395/148; 395/100;
364/225.6; 364/225.7; 364/225.8; 364/DIG. 1;
364/943; 364/943.1; 364/943.2; 364/943.43;
364/DIG. 2
[58] Field of Search ... 364/200 MS File, 900 MS File;
395/100

[56] References Cited

U.S. PATENT DOCUMENTS

| | | | |
|---|---|---|---|
| 3,654,609 | 4/1972 | Bluethman et al. | 364/200 |
| 3,991,405 | 11/1976 | Boyd et al. | 364/900 |
| 4,026,402 | 5/1977 | Byrd | 364/900 |
| 4,195,353 | 3/1980 | Abe et al. | 364/900 |
| 4,212,077 | 6/1980 | Vittorelli | 364/900 |
| 4,223,393 | 9/1980 | Abe et al. | 364/900 |
| 4,244,031 | 1/1981 | Izushima et al. | 364/900 |
| 4,290,116 | 9/1981 | Morse | 364/900 |
| 4,456,972 | 6/1984 | Lee et al. | 364/900 |
| 4,513,391 | 4/1985 | Maddock | 364/900 |
| 4,545,015 | 10/1985 | Baunach et al. | 364/200 |
| 4,553,860 | 11/1985 | Imaizumi et al. | 364/900 |
| 4,589,785 | 5/1986 | Sato | 364/900 |
| 4,901,223 | 2/1990 | Rhyne | 364/200 |

FOREIGN PATENT DOCUMENTS 1596254 8/1981 United Kingdom .
0062121 10/1982 United Kingdom .............. 364/200

Primary Examiner—David L. Clark
Assistant Examiner—Maria N. Von Buhr
Attorney, Agent, or Firm—Kane, Dalsimer, Sullivan, Kurucz, Levy, Eisele and Richard

[57] ABSTRACT

In a text editing device having a function capable of automatically executing a line feed operation, such line feed operation is inhibited during input operations which are sequentially executed at a high speed, with the inhibit operation being released when a predetermined condition, for example, input operation at a right hand margin or of a space or hyphen at a hotzone or the like, is satisfied. Thus, the time for character display corresponding to the inputted data is shortened.

18 Claims, 13 Drawing Sheets

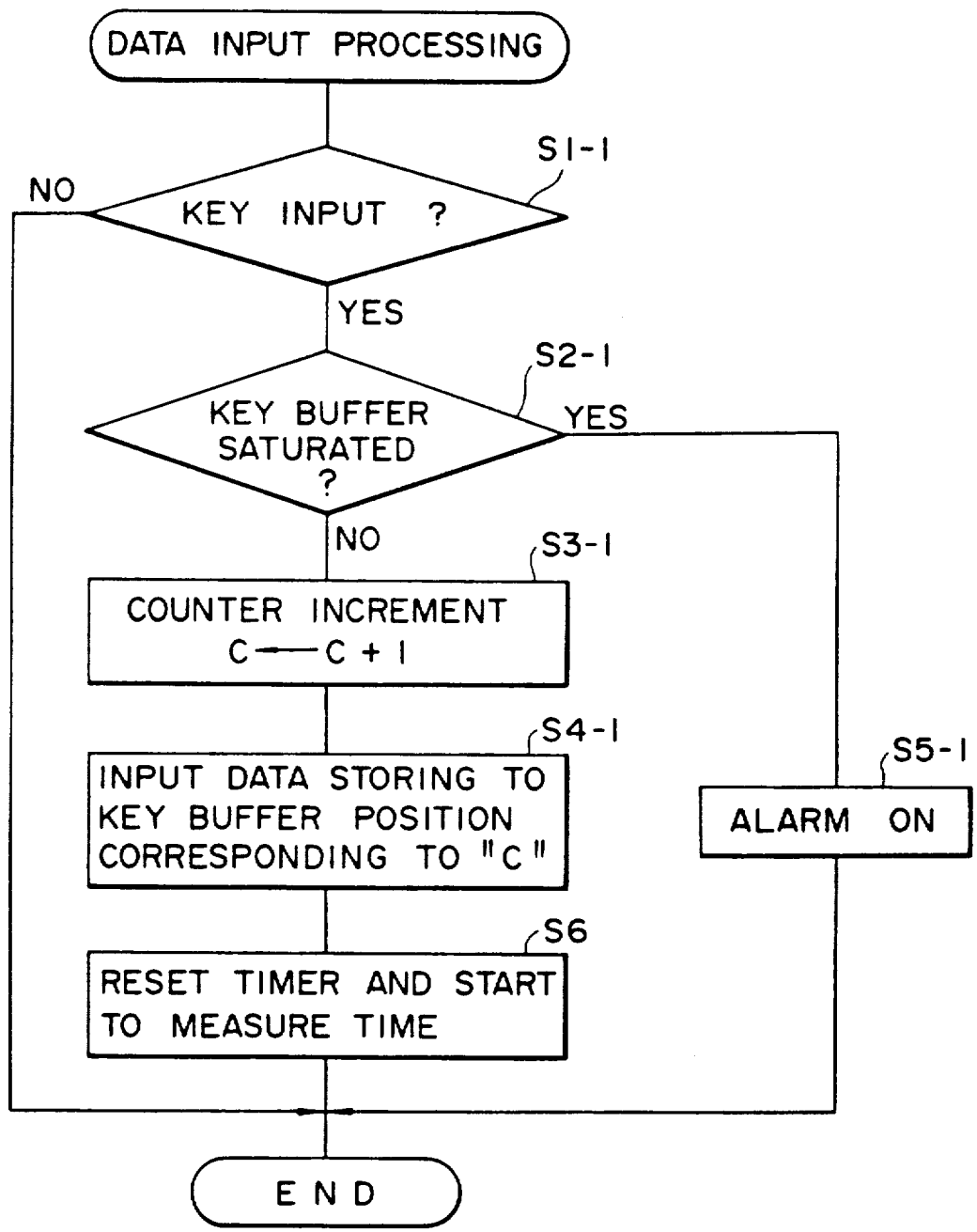

TEXT EDITING DEVICE

BACKGROUND OF THE INVENTION

This invention relates to a text editing device having a function capable of displaying an edited text data on a diaplay and provided with an automatic line feed function for shifting character data located at a predetermined line end area to the succeeding line in case that a line extends beyond the predetermined area by a successive inputting operation of character data, more particularly, to a text editing device further having a function capable of inhibiting the line feed operation in case that the input operation is executed at intervals of time less than a predetermined value.

Conventionally, this kind of a device displays edited text data in such a procedure that character data such as characters and symbols inputted through a keyboard or the like is temporarily stored in a buffer and then the stored character data is sequentially read out and displayed on a display. When the character data is displayed, it is determined whether the final inputted character data at the end of line is to exceed a predetermined position set in advance and an automatic line feed is executed in such a procedure that the chatacter data at the end of the line is shifted to the succeeding line based on the result of this decision.

With this conventional text editing device, when the number of characters capable of being inputted per line or a display area on a display is set in advance according to the format of a text to be prepared, the edited text data can be displayed in a desired format. Further, since it is not necessary to manually instruct a line feed operation, the text can be efficiently prepared. This conventional device, however, has a problem in that since a decision processing for effecting an automatic line feed operation is executed every time a single character data is displayed, the display of the character data requires a period of time longer than that neccessary to input the character data when a keyboard is operated at a high speed and the character data is stored to a buffer at a high speed, whereby the buffer is saturated to prevent a lot of character data from being inputted at a high speed.

In particular, when character data is inserted during the text preparation is executed, the automatic line feed operations are often executed and further the line feed operation of an input line causes a line feed operation to the succeeding lines, so that a period of time necessary to display the character data is greatly increased, whereby it is difficult to successively input a lot of character data at a high speed.

SUMMARY OF THE INVENTION

It is therefore an object of the invention to provide an improved text editing device having an automatic line feed function further having a function capable of inhibiting the automatic function in case that successive data input operations at intervals of time less than a predetermined value are executed at a high speed.

For this purpose, according to the invention, there is provided a text editing device comprising input means for inputting character data, represent means for representing characters in response to the inputted data, and input position designate means for arbitrarily designating an input position at which a character is to be inputted on the represent means, the text editing device further comprises: mode change means for changing input modes between a normal input mode for executing an input operation of character data to the position designated by the input position designate means and at least an insert input mode for inputting character data to the position with backward shifting the character having been represented below the designated position; reform means for automatically moving the character data to a succeeding line on the represent means in case that the character data reaches to a position located below a predetermined position of a line on the represent means; and inhibit means for inhibiting an execution of the reforming operation of the reform means, when the insert input mode is designated by the mode change means, in case that a plurality of character data are successively inputted at intervals of time less than a predetermined value.

DESCRIPTION OF THE ACCOMPANYING DRAWINGS

Figure 2:
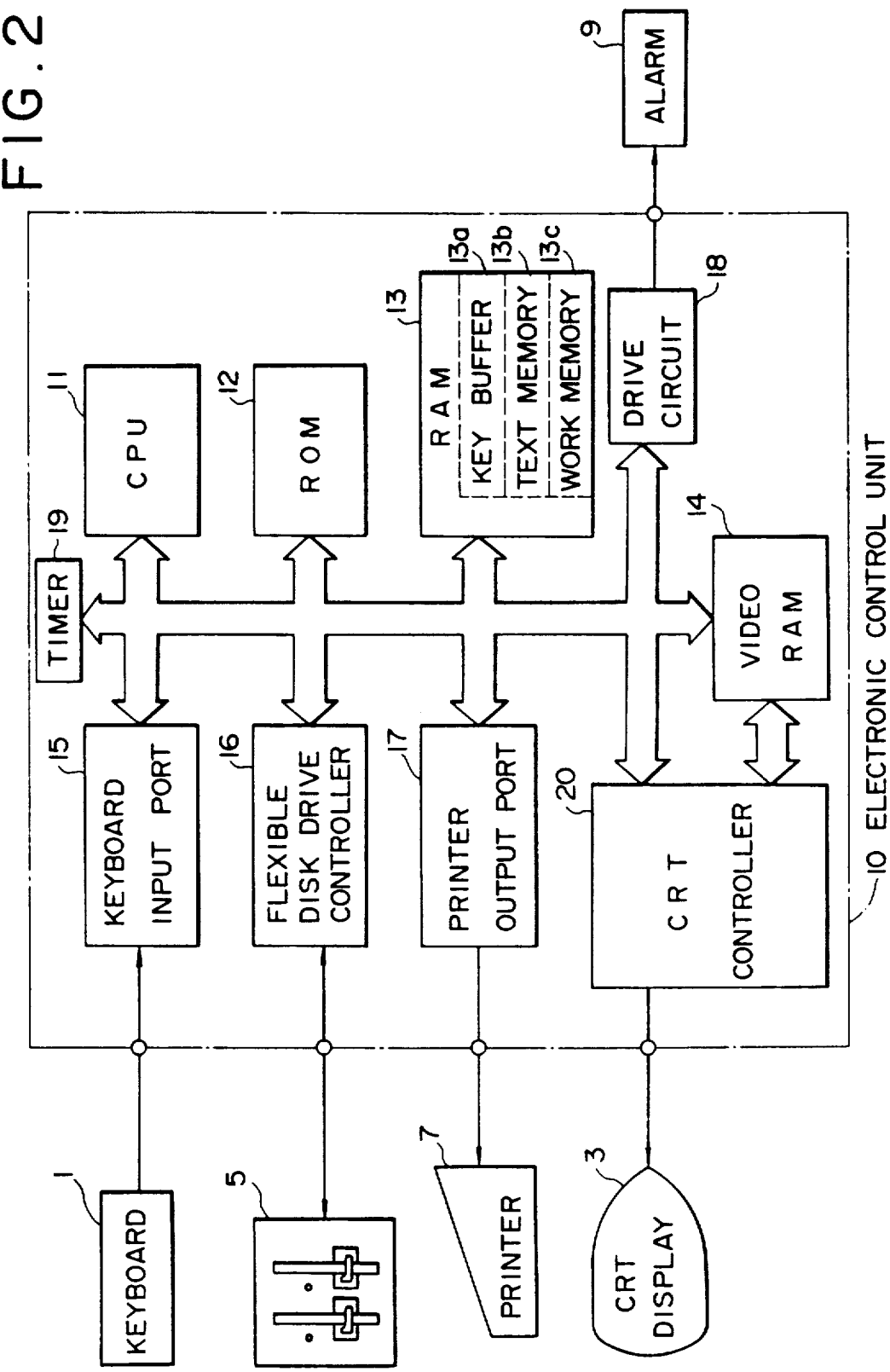
FIG. 2 is a block diagram of an electronic control unit provided on the text editing device embodying the present invention.
Figure 5:
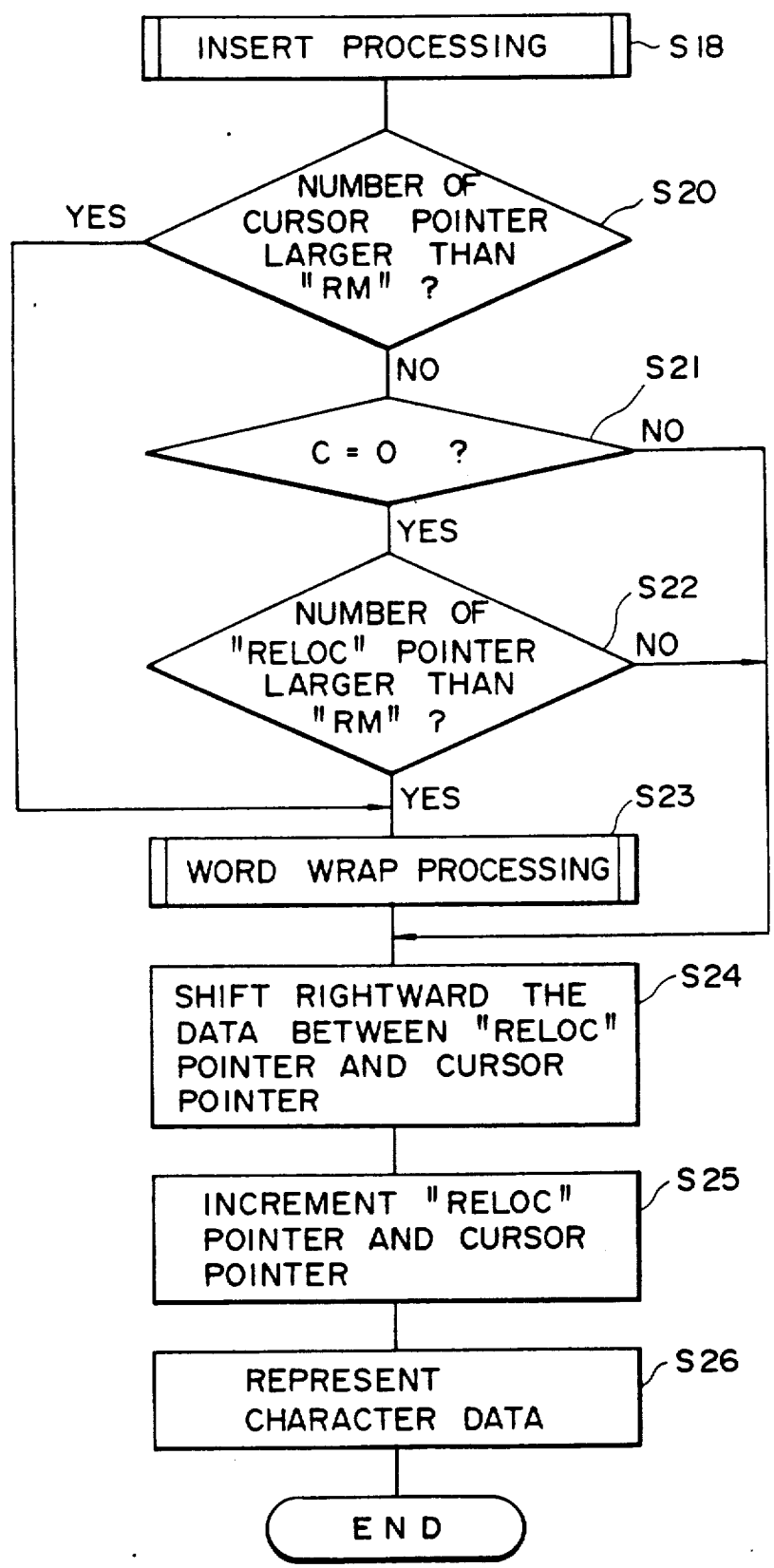
FIG. 5 is a flowchart of an insert processing executed by the electronic control unit of FIG. 2.
Figure 9:
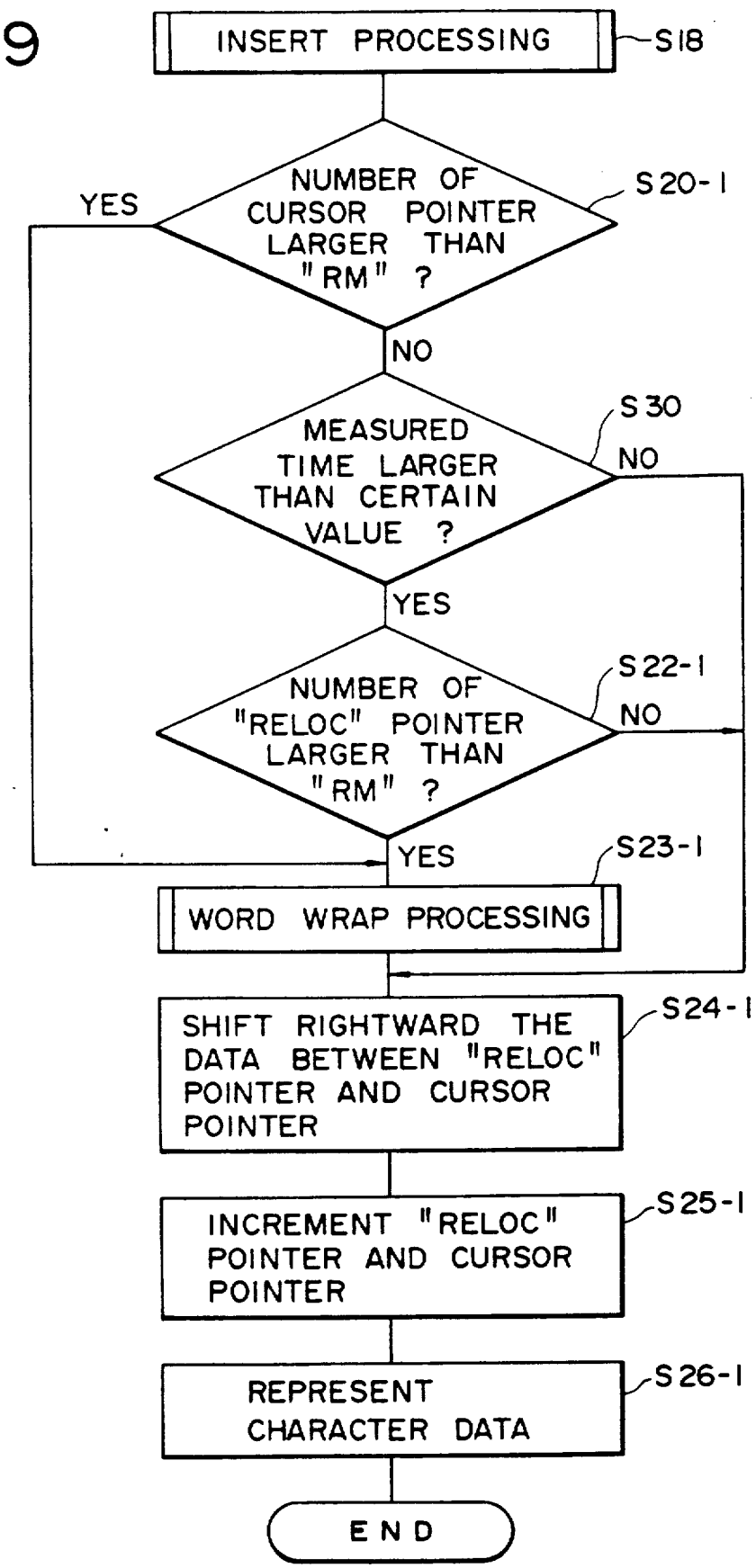
Figure 10:
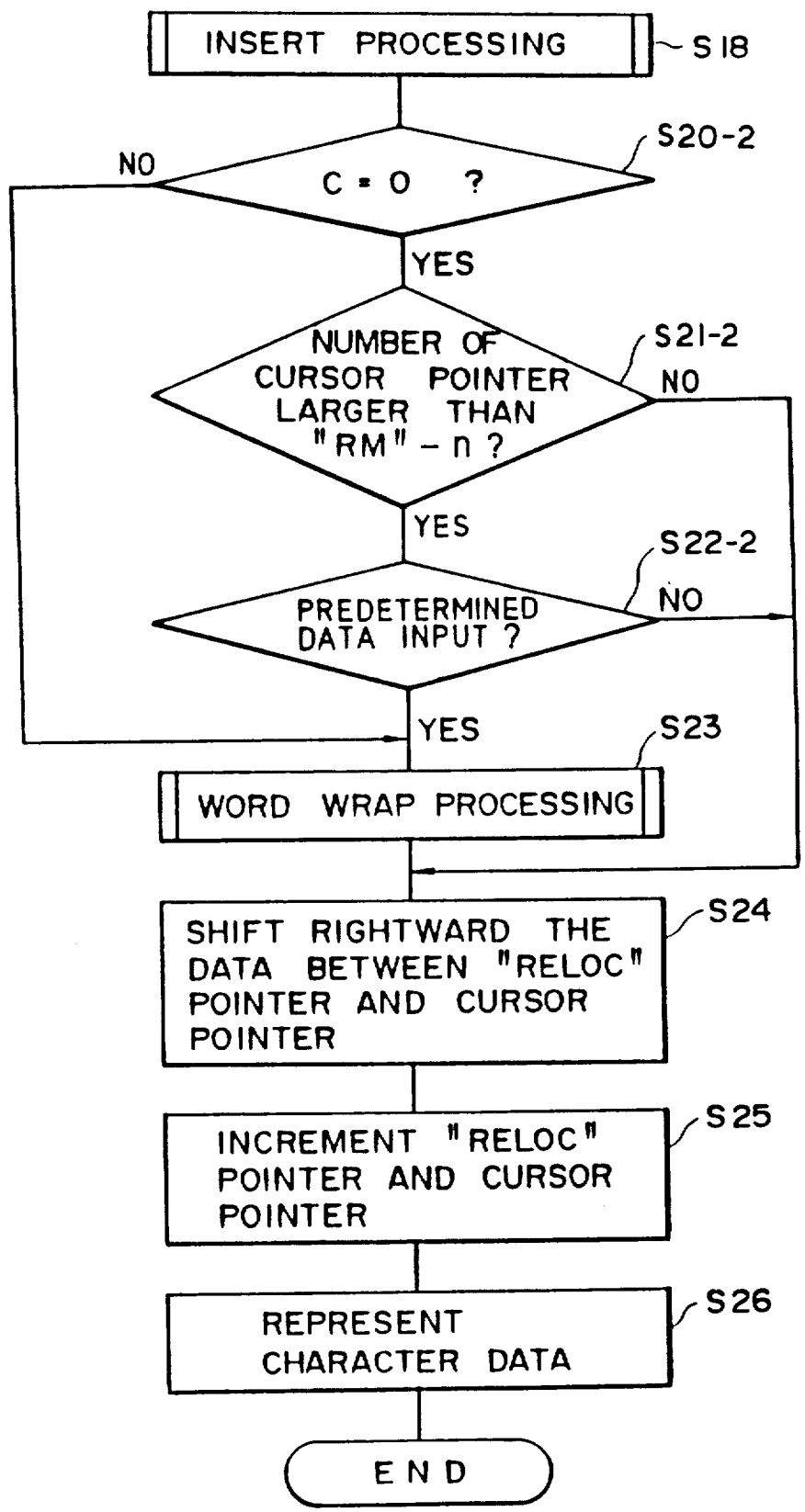
Figure 12A:
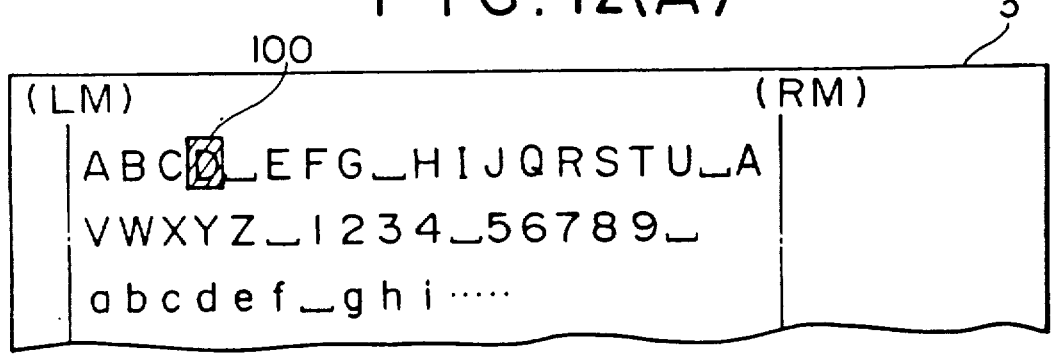
Figure 12B:
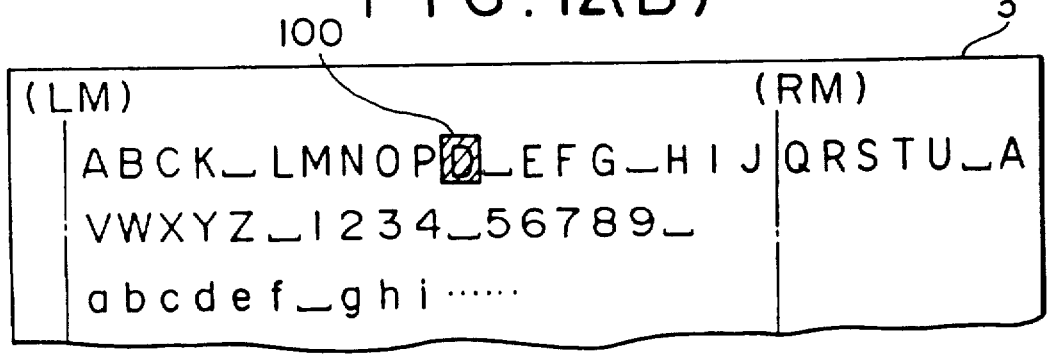
Figure 12C:
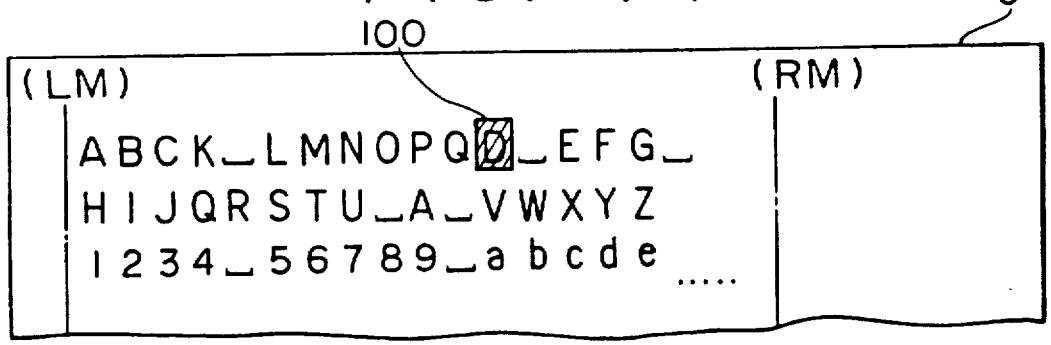
Figure 13:
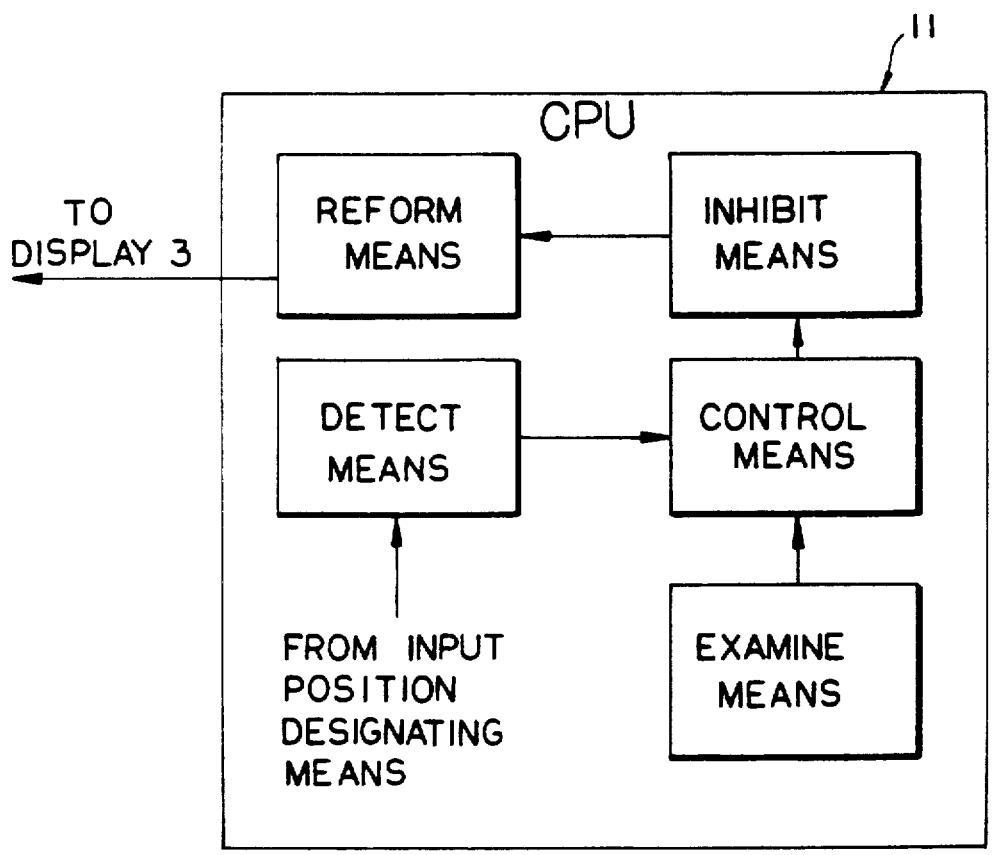

FIGS. 7(A), 7(B), 7(C) and 7(D) are explanatory views of a data movement on a display in case that the processing shown in FIG. 5 is excuted;

FIG. 8 is an another flowchart of a data input processing by the electronic control unit of FIG. 2;

FIG. 9 is an another flowchart of an insert processing executed by the electronic control unit of FIG. 2;

FIG. 10 is an another flowchart of an insert processing executed by the electronic control unit of FIG. 2;

FIGS. 11(A) through 11(D) are explanatory views of data movements on a display in case that the processing shown in FIG. 10 is executed;

FIGS. 12(A) through 12(C) are explanatory views of data movements on a display in case that the successively inputted character are reached the side edge of display; and FIG. 13 is a block diagram depicting portions of the CPU.

DESCRIPTION OF THE EMBODIMENTS

An embodiment of this invention will be described below with reference to drawings.

Figure 1:
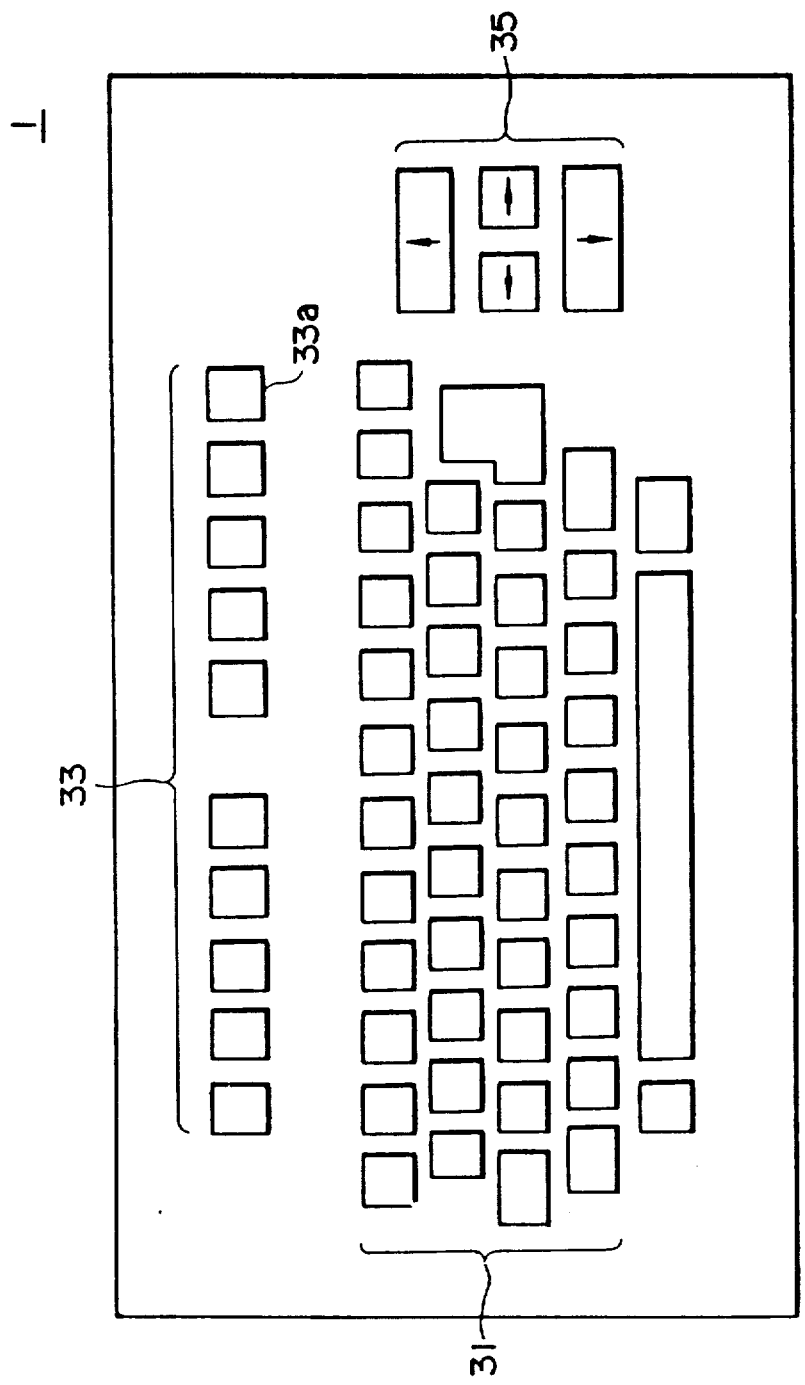
FIG. 1 shows an arrangement of a keyboard provided on a word processor as a text editing device embodying the present invention.

FIG. 1 is an illustrative view showing an arrangement of a keyboard provided on a word processor as a text editing device embodying the present invention.

The keyboard 1 is provided with character keys 31 for inputting the character data corresponding to the characters and symbols, various instruction keys 33 for inputting instruction codes for a text editing, printing and the like of a text, cursor movement keys 35 for moving a cursor 100 and the like. When these various keys are depressed, a key code previously set for each of the keys is generated. This arrangement enables an operator to prepare a text by depressing the character keys 31, to edit and print the text as necessary as well as to write the text data.

As shown in FIG. 2, the text editing device of this embodiment comprises the keyboard 1, a display unit (CRT: Cathode Ray Tube) 3 for displaying text data composed of a lot of character data, a flexible disk drive 5 as an external recording unit, a printer 7 for printing character data composing the text data using a daisy-wheel, a buzzer 9 as an alarm unit for notifying an abnormal state to the operator, and an electronic control unit 10 electrically connected to these units for controlling the preparation, display and printing of a text and the like.

The electronic control unit 10 is composed of a logic circuit including a known CPU (Central Processing Unit) 11, ROM (Read Only Memory) 12, RAM (Random Access Memory) 13 and the like as a main part, a video RAM 14 for recording the data displayed on the CRT display 3, a keyboard input port 15 for effecting key data input from the keyboard 1, a flexible disk drive controller 16 for reading/writing data by controlling the flexible disk drive 5, a printer output port 17 for outputting print data to the printer 7, a drive circuit 18 for actuating the buzzer 9 to provide notice of an abnormal state to the operator and a timer 18 for measuring a desired time such as an interrupt time for executing an interrupt processing to be described blow.

The RAM 13 is provided with a key buffer 13a for providing input data from the keyboard 1, a text memory 13b for temporarily storing the text data and a work memory 13b used for temporarily storing data for editing a text and the like and storing various data in the state in which it can be rewritten. The ROM 12 stores a control program for effecting the preparation, display, printing and the like of the text and initial data.

On the other hand, the video RAM 14 is composed of a dual port RAM and thus can also be accessed by a CRT controller 20 provided independently of the CPU 11. The CRT controller 19 repeatedly reads out the contents of the video RAM 14 in the cycle determined by the scanning frequency of the CRT display 3 and displays them thereon. Therefore, the character data written into the predetermined area of the video RAM 14 by the CPU 11 is displayed on the CRT display 3 at once.

The text data stored in the text memory 13b of the RAM 13 may be transferred to the flexible disk set in the flexible disk drive 5 through the flexible disk drive controller 18. Further, the instruction keys 33 include an input mode change key 33a for instruction whether character data inputted by depressing the character keys 31 is to be insertted into the text under preparation by an insert-on-mode or by an insert-off-mode (overwrite mode).

As shown in FIG. 13, CPU 11 includes the functional elements of a detect means which receives input from the position designating means; an examine means; a control means responsive to the detect means and the examine means; an inhibit means responsive to the control means; and a reform means responsive to the inhibit means. CPU 11, by way of the reform means, communicates with the display 3.

Figure 3:
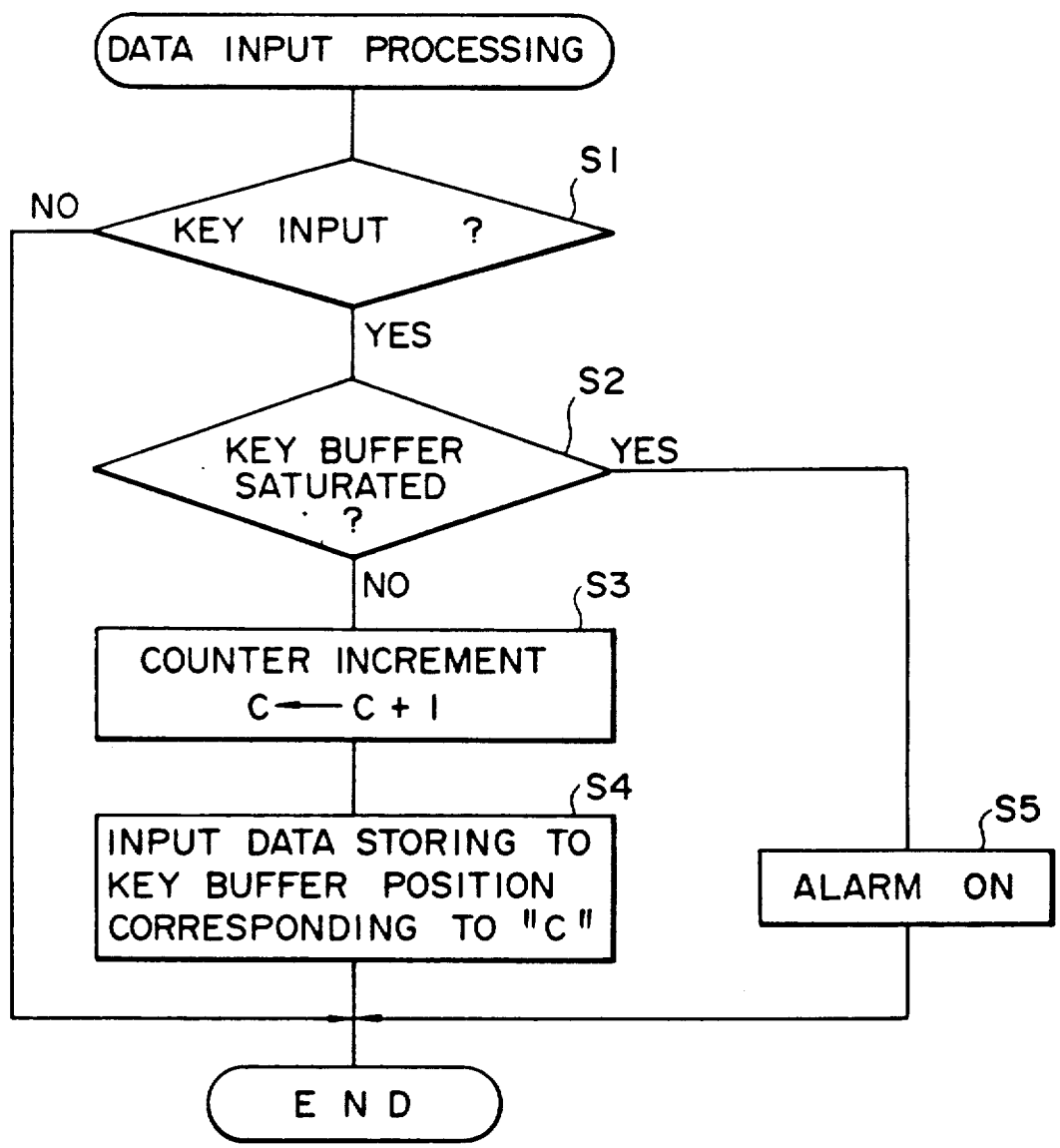
FIG. 3 is a flowchart of a data input processing executed by the electronic control unit of FIG. 2.

With, this text editing device as described above, data input processing is executed every predetermined time (for example, 2 m sec.) as shown in FIG. 3 and thus data inputted through the keyboard 1 are stored in the key buffer 13a.

More specifically, in this data input processing, a key scanning is carried out to determine whether the operator effects a key input operation or not (step S1). When the key input is effected, the input data is stored in the key buffer 13a in such a procedure that it is confirmed that the key buffer 13a is not saturated (step S2-YES), a counter "C" showing an amount of data stored in the key buffer 13a is incremented (step S3) and the input data is stored in the storing location corresponding to the value of the counter "C" (step S4). When it is determined at step S1 that the key input is not effected, the succeeding processings are not necessary, and then the flow is terminated. Further, when it is determined that the key buffer 13a is saturated at step S2, since the inputted data cannot be stored in the key buffer 13a, the buzzer 9 is actuated to notify this state to the operator (step S5) and the flow is terminated.

Figure 4:
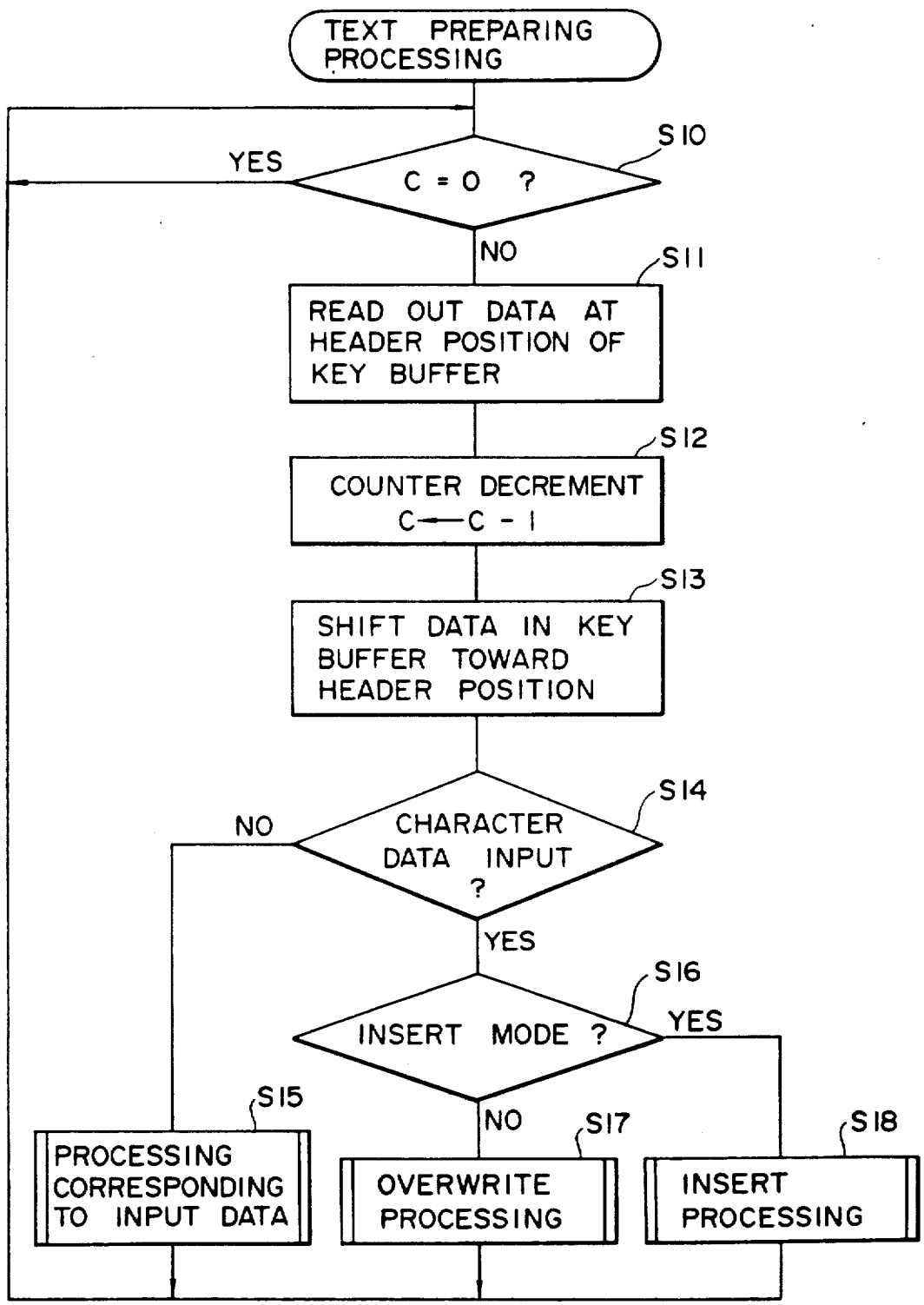
FIG. 4 is a flowchart of a text preparing processing executed by the electronic control unit of FIG. 2.

Next, FIG. 4 shows a text preparing processing repeatedly executed when the device is in a text preparation mode. This processing rewrites the content of the video RAM 14 and displays, on the CRT display 3, a cursor 100 indicating the location of the text data under preparation or the location where data is inputted on the text data every time the data is inputted through the keyboard 1, and stores the prepared text data in the text memory 13b every time an input line is shifted or the like. Various processings such as the input, edit and the like of the data are executed by storing the text data of the line (referred to as a cursor line, hereinafter) covered by the data input displayed by the cursor 100 on the CRT display 3 and for each text data on the cursor line.

As shown in FIG. 4, when the text preparing processing starts, a processing at step S10 is primarily executed to determine whether the value of the counter "C" is zero or not, i.e., input data is stored in the key buffer 13a or not. When it is determined that the value of the counter "C" is not zero and the key buffer 13a stores the input data at step S10, the flow goes to step S11 where the input data stored at the header data storing position in the key buffer 13a is read out, the value of the counter "C" is decremented at step S12, the input data in the key buffer 13a is shifted in the header direction to change the location where the data is stored at step S13, and then the flow goes to step S14. At step S14, it is determined whether the input data read out at step S11 is character data. When the input data is not character data, the flow goes to step S15 to execute a processing corresponding to the inputted data (e.g., copying, moving, deleting and the like of the character data).

Conversely, when the inputted data is the character data, the flow goes to step S16 where it is determined whether the input mode of the character data set by the input mode change key 33a at present is an insert-on-mode. When the input mode is not the insert-on-mode, the flow goes to step 17 where a processing by an insert-off-mode is executed to change the character data at the cursor position to the character data read out at step S11 in the work memory 13c and rewrite the document data of the cursor line in the video RAM 14. Conversely, when the input mode is the insert-on-mode, the flow goes to step S18 where an insert processing is executed, as shown in FIG. 5.

As shown in FIG. 5, this insert processing, a processing at step S20 is primarily executed to determine whether a cursor pointer "PK" indicating a cursor position on the display exceeds a right margin (RM) set in advance. As known well, this right margin (RM) indicates a right end position of the respective lines of the edited text and as shown in FIG. 6, the cursor pointer (PK) is stored in the work memory 13c together with character data ("Q" in FIG. 6) shown by the cursor 100. Then, as shown in FIG. 6, it is determined whether the insertion of the input data ("K" in FIG. 6) into the cursor position causes the character data (Q) shown by the cursor 100 to exceed the right margin (RM) depending on whether the position of the cursor pointer (PK) exceeds the right margin (RM) set in advance at step S20.

Figure 6A:
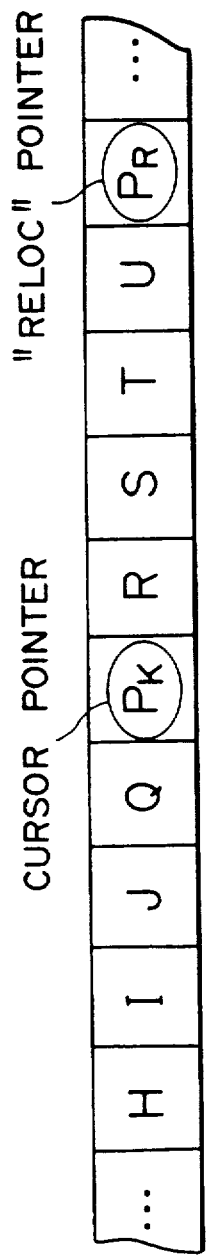
FIGS. 6A and 6B are explanatory views of a data arrangement of a line on which a cursor is placed.
Figure 6B:
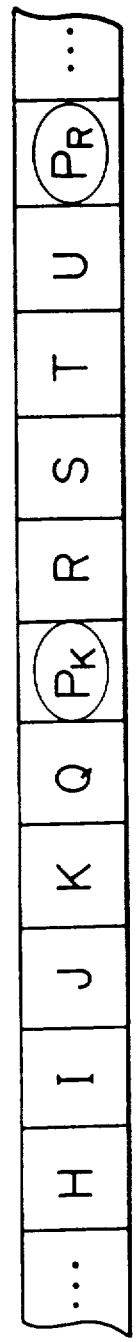

When it is determined at step S20 that the cursor pointer (PK) does not exceed the right margin (RM), the flow goes to step S21 where it is determined whether the value of the counter "C" is zero or not, i.e., data still remains in the key buffer 13a. When the value of the counter "C" is zero, the flow goes to step S22 where it is determined whether a "RELOC" pointer (PR) indicating that the position of the character data at the end of the cursor line exceeds the right margin (RM). As shown in FIG. 6(A), since the "RELOC" pointer (PR) is stored in the work memory 13c together with character data ("U" in FIG. 6) at the end of the cursor line, as shown in FIG. 6(B), it is determined whether the insertion of input data ("K" in FIG. 6) into the cursor position causes the character data (U) at the line end exceeds the right margin (RM) depending on whether the position of the "RELOC" pointer (PR) exceeds the right margin (RM) set in advance at step S22.

When it is determined that the "RELOC" pointer (PR) exceeds the right margin (RM) at step S22 or the cursor pointer (PK) exceeds the right margin (RM) at step S20, the flow goes to step S23 where a known word wrap processing is executed to shift a series of word data including the character data at the line end or word data including the character data shown by the cursor 100 and all the character data at the right hand side of the word data to the succeeding line.

Next, when the word wrap processing is executed at step S23 or it is determined that the key buffer 13a includes data to be processed at step S21, the flow goes to step S24 where data from the cursor pointer (PK) to the "RELOC" pointer (PR) is shifted to the line end direction (to the right hand direction in FIG. 6).

Then, the flow goes to step S25 to increment the positional data of the cursor pointer (PK) and the "RELOC" pointer (PR) and executes a character data display processing at step S26 to store character data read out from the key buffer 13a to a data storing area which become empty by shifting the above data and rewrite the cursor line data in the video RAM 14 according to the line data in the work memory 13a to which the data is inputted to terminate the insert processing. Note that when a lot of data is inserted into a line head and the data at a line end exceeds the display area of the CRT display 3, the data are not displayed.

As described above, according to the text editing device of this embodiment, the word wrap processing for automatically executing a line feed operations of the cursor line is executed when the display of input data causes a cursor position to exceed the right margin (RM) on the CRT display 3 or when the key buffer 13a includes no inputted data and the display of inputted data causes the character data at a line end to exceed the right margin (RM). When the key buffer 13a contains inputted data, the processing at step 21 is executed the word wrap processing even if the display of the inputted data causes the character data at the line end to exceed the right margin (RM).

Figure 7A:
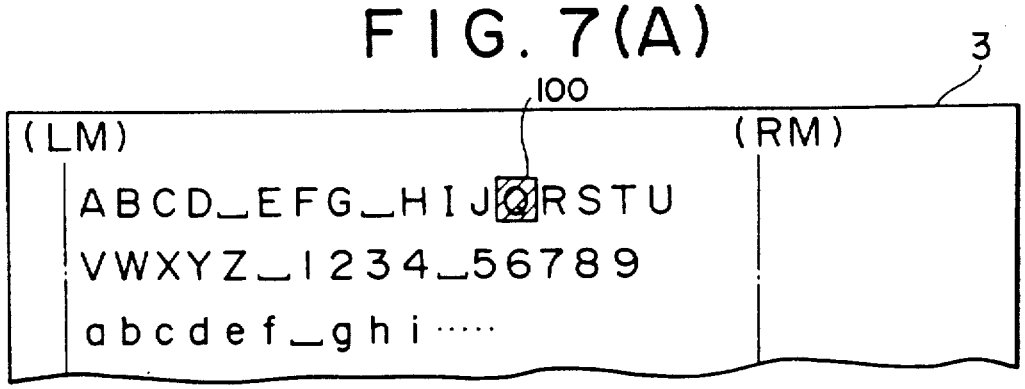
Figure 7B:
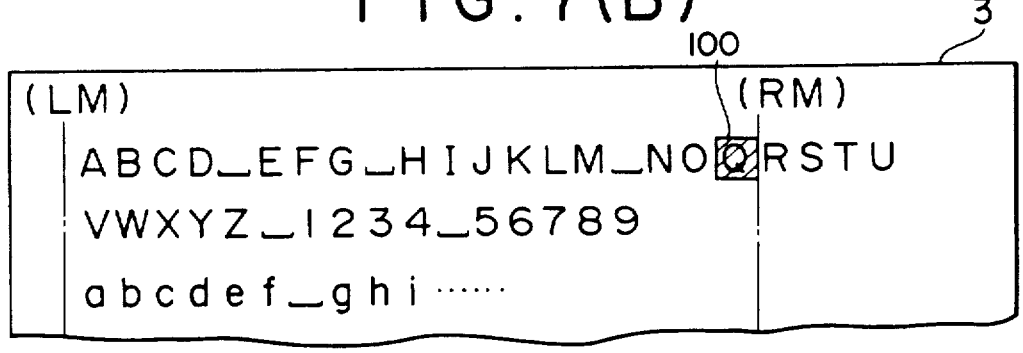
Figure 7C:
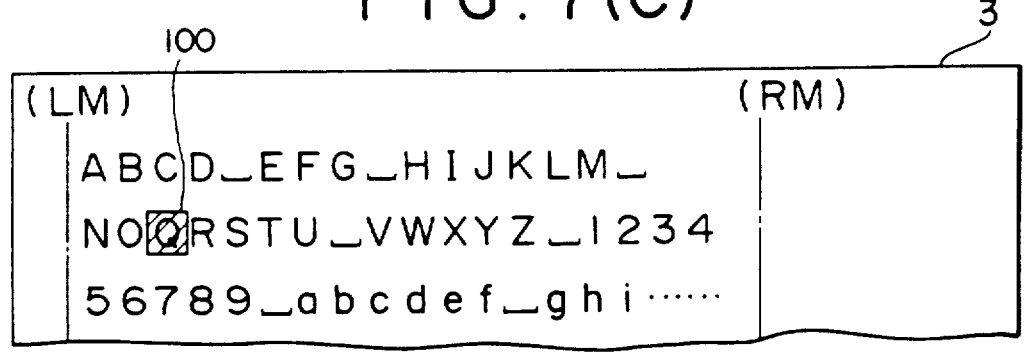
Figure 7D:
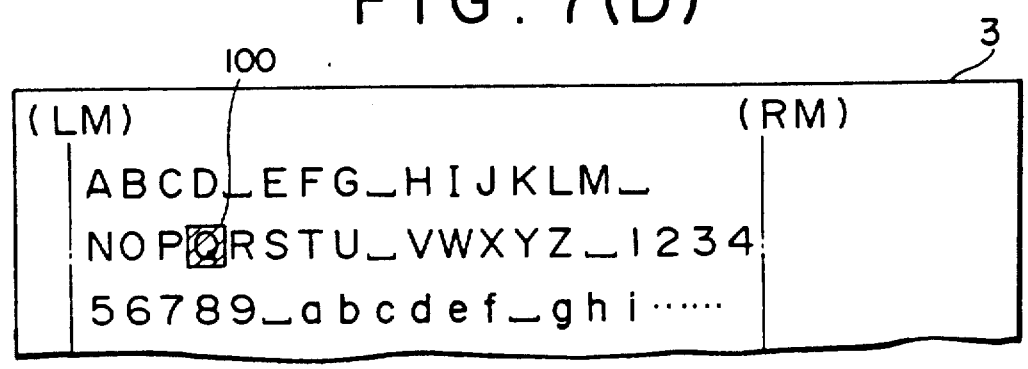

As a result, when the keyboard 1 is operated at a high speed in a state shown in FIG. 7(A) and input data is accumulated in the key buffer 13a, inputted data are displayed on the cursor line as they are, as shown in FIG. 7(B) and the character data at the line end exceeding the right margin (RM) are displayed as they are. When a key input is interrupted in the state, for example, shown in FIG. 7(B), a group of the character data including a character data of the cursor 100 is shifted to the succeeding line by the word wrap processing, as shown in FIG. 7(C), and the word wrap processing is sequentially executed to the succeeding line data, whereby the text data is rearranged (subjected to a reform processing). In addition, when a high speed key input is further continued in the state shown in FIG. 7(B), the cursor 100 exceeds the right margin (RM) as shown in FIG. 7(B) so that the word wrap processing is also executed in this case like the above case and then the data inputted at a high speed is displayed on the succeeding line as a cursor line. In other words, the cursor 100 is not able to be moved with exceeding the right margin (RM). Therefore, a data corresponding to the character "P" is continuously inputted in the state shown in FIG. 7(B), the word wrap processing is executed and the state on the display 3 is changed to the state shown in FIG. 7(D). Accordingly, when a plurality of data are successively inputted at a high speed, characters below the cursor 100 are displayed with exceeding the right margin, without a margin-release key operation provided on a conventional device. Note that (LM) in FIG. 7(A) through 7(D) designates a left margin showing the left end of the text data.

As described above, according to the text editing device of this embodiment, a period of time necessary to display characters corresponding to the inputted data can be shortened when character data are inputted at a high speed as compared with a conventional device which executes a word wrap processing every time character data is inserted, whereby character data in the key buffer 13a be read out promptly to prevent the saturation of the key buffer 13a.

With the above embodiment, it is determined whether the key buffer 13a includes data by the processing at step S21, and when the key buffer 13a includes the data, the word wrap processing is not executed. However, the same effect as the above embodiment can be obtained by refraining from executing the word wrap processing until a predetermined period of time elapses after a key input operation is effected. More specifically, the timer 19 is reset to measure a period of time elapsed every time input data is stored in the key buffer 13a by a data input processing (step S1-1–S4-1), as shown in FIG. 8, and it is determined whether the elapsed period of time measured by the timer exceeds a predetermined period of time at step S30 corresponding to step S21 for the insert processing of the above embodiment, as shown in FIG. 9. Alternatively, it is determined whether the "RELOC" pointer (PR) exceeds the right margin (RM) only when the period of time after the data input exceeds the predetermined period of time (step S22-1) to execute the word wrap processing (step S23-1).

Figure 11A:
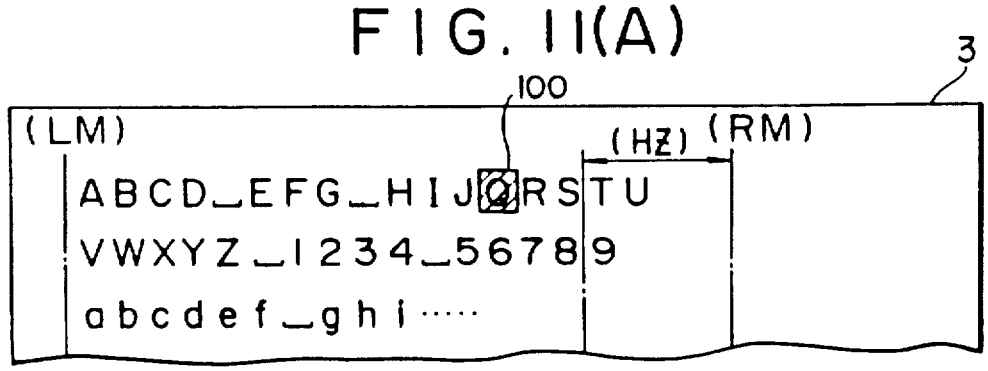
Figure 11B:
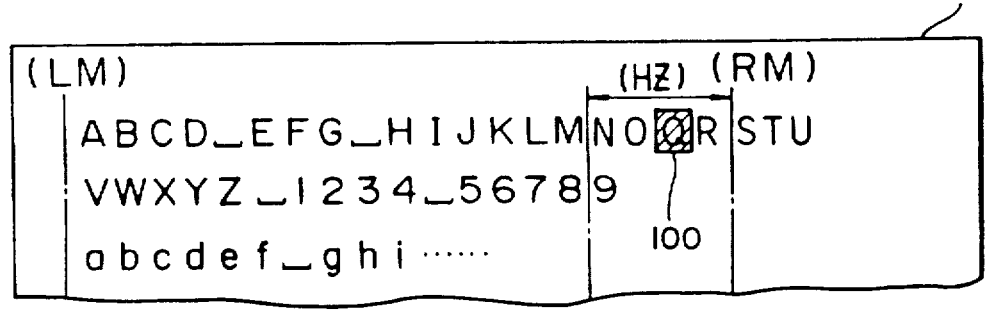
Figure 11C:
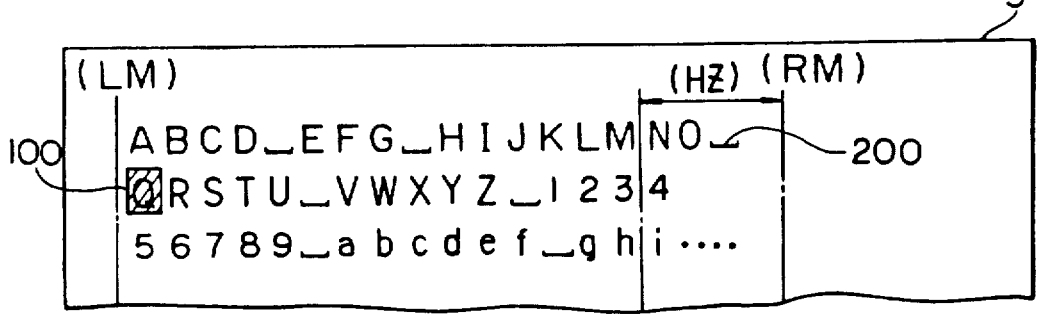

Further, in the above embodiment, although an example of the text editing device for executing the word wrap processing as an automatic line feed, this invention is applicable to a text editing device capable of executing a known automatic return processing, wherein an area covering several characters (e.g., seven characters) on the left hand side of the right margin (RM) is designated as so-called hot-zone, and when space or hyphen indicating a place to leave off words is inserted into this area, the character data at a line end is predicted to exceed the right margin (RM) and an input line is changed to the next line. More specifically, like the above embodiment, text data may be reformed by effecting the automatic return processing only when the cursor is in the hot-zone and space or hyphen is inserted. In this case, as shown in FIG. 10, it is determined whether the cursor pointer is located at a position corresponding to the position in the hot-zone or not at step S21-2, further a predetermined data, for example, hyphen or space and the like, is inputted or not at step S22-2. If it is determined that the predetermined data, space data or hyphen data and the like, is inputted in hot-zone, the word wrap processing is executed at step S23, similar to S23 of FIG. 5 and FIG. 9. As a result, as shown in FIGS. 11(A) through 11(D), the inputted data displayed after the right margin (RM) are reformed. As shown in FIGS. 11(A) and 11(B), the data are successively inputted and the characters corresponding to the inputted data are respectively displayed on the display 3 before the cursor 100 indicating the "Q" position. During the above inputting operation, if the data corresponding to a space 200 is inputted in a hot-zone (HZ), it is determined that an another word separated by the space 200 is inputted and the reform operation is executed, and further the state on the display 3 is changed to the state as shown in FIG. 11(C).

Figure 11D:
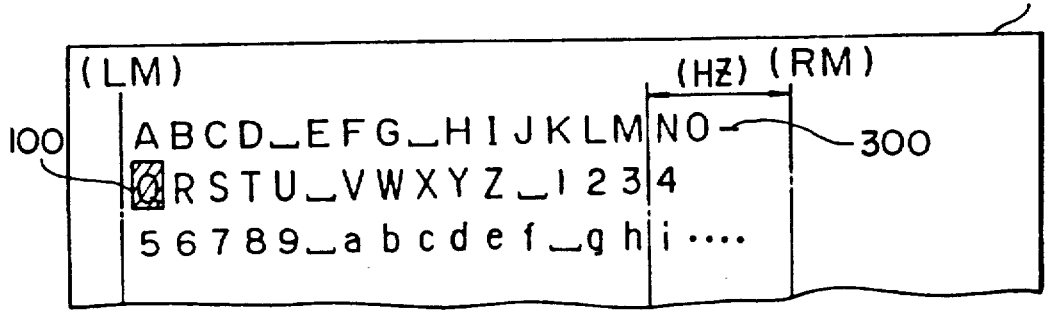

Furthermore, if the data corresponding to a hyphen 300 is inputted, instead of the space 200, the state is changed to the state shown in FIG. 11(D). Further, when the characters larger than the number of characters capable of being displayed from the right margin (RM) to the side edge of the display 3 before the cursor 100 as shown in FIGS. 12(A) and (B), a character string is automatically reformed and the state shown in FIG. 11(B) is changed to the state shown in FIG. 11(C).

What is claimed is:

1. A text editing device comprising input means for inputting character data, representing means for representing characters in response to the inputted data, and input position designating means for arbitrarily designating an input position at which a character is to be inputted on said representing means, said text editing device further comprises:
    mode change means for changing input modes between a normal input mode for executing an input operation of character data to the position designated by said input position designating means and an insert input mode for inputting character data to said position with backward shifting of the character represented below said designated position;
    reform means for automatically moving the character data to a succeeding line on said representing means simultaneously with representing said character data on said representing means if the character data reaches a position located beyond a predetermined position of a line on said representing means; and
    inhibit means for inhibiting an execution of the reforming operation of said reform means, when the insert input mode is designated by said mode change means and a plurality of character data are successively inputted at intervals of time less than a predetermined value whereby said existing character data as well as said inputted character data are represented on said represent means even though they overspill the predetermined position when said reforming operation is inhibited.

2. The text editing device according to claim 1 which further comprises detect means for detecting a position at which the input position designated by said input position designating means is located, and
    control means for controlling said inhibit means so as not to be operated if the position detected by said detect means is located at said predetermined position.

3. The text editing device according to claim 1 wherein said predetermined position is a right margin position of said representing means.

4. The text editing device according to claim 1 which further comprises examine means for examining whether a predetermined data is located in a predetermined area preceding said predetermined position; and
    control means for controlling said inhibit means so as not to be operated if data examined by said examine means is said predetermined data.

5. The text editing device according to claim 4 wherein said predetermined data comprises data representative of a space.

6. The text editing device according to claim 4 wherein said predetermined data comprises data representative of a hyphen.

7. The text editing device according to claim 1 which further comprises measure means for measuring an interval of time after a character data is inputted through said input means; and
    control means for controlling said inhibit means so as not to be operated if the interval of time measured exceeds the predetermined value.

8. The text editing device according to claim 1 which further comprises control means for controlling said inhibit means so as not to be operated if a character corresponding to the data inputted reaches a side edge of said representing means.

9. The text editing device according to claim 2 wherein said reforming operation performed by said control means is a word wrap operation whereby all of the characters located below said predetermined position are reformed.

10. A text editing device comprising input means for inputting character data, representing means for representing characters in response to the inputted data, and input position designating means for arbitrarily designating an input position at which a character is to be inputted on said representing means, said text editing device further comprises:
    mode change means for changing input modes between a normal input mode for executing an input operation of character data to a position designated by said input position designating means and an insert input mode for inputting character data to said position with backward shifting of the character represented below said designated position;
    reform means for automatically moving the character data to a succeeding line on said representing means simultaneously with character data inputting if the character data reach a position located beyond a predetermined position of a line on said representing means; and
    inhibit means for inhibiting an execution of the reforming operation of said reform means, when the insert input mode is designated by said mode change means and a plurality of character data are successively inputted at intervals of time less than a predetermined value;

detect means for detecting a position at which the input position designated by said input position designating means is located; and control means for controlling said inhibit means so as not to be operated if the position detected by said detect means is located at said predetermined position.

11. The text editing device according to claim 10 wherein said predetermined position is a right margin position of said representing means.

12. The text editing device according to claim 10 which further comprises examine means for examining whether a predetermined data is located in a predetermined area preceding said predetermined position; and control means for controlling said inhibit means so as not to be operated if data examined by said examine means is said predetermined data.

13. The text editing device according to claim 10 wherein said reforming operation performed by said control means is a word wrap operation whereby all of the characters located below said predetermined position are reformed.

14. A text editing device comprising input means for inputting character data, representing means for representing characters in response to the inputted data, and input position designating means for arbitrarily designating an input position at which a character is to be inputted on said representing means, and memory means for temporarily storing the data corresponding to a predetermined number of characters to be represented on said representing means, said text editing device further comprises:

mode change means for changing input modes between a normal input mode for executing an input operation of character data to a position designated by said input position designating means and an insert input mode for inputting character data to said position with backward shifting of the character represented below said designated position;

reform means for automatically moving the character data to a succeeding line on said representing means in case the character data reach a position located beyond a predetermined position of a line on said representing means;

examine means for examining a number of characters corresponding to the data stored in said memory means when the insert input mode is designated by said mode change means; and inhibit means for inhibiting execution of the reforming operation of said reform means if the number examined by said examine means is larger than another predetermined number.

15. The text editing device according to claim 14 wherein said another predetermined number is zero.

16. The text editing device according to claim 14 which further comprises detect means for detecting a position at which the input position designated by said input position designating means is located, and control means for controlling said inhibit means so as not to be operated if the position detected by said detect means is located at said predetermined position.

17. The text editing device according to claim 14 which further comprises examine means for examining whether a predetermined data is located in a predetermined area preceding said predetermined position; and control means for controlling said inhibit means so as not to be operated if data examined by said examine means is said predetermined data.

18. The text editing device according to claim 16 wherein said reforming operation performed by said control means is a word wrap operation whereby all of the characters located below said predetermined position are reformed.

* * * * *